(12) United States Patent
Feldmeier

(10) Patent No.: US 7,186,430 B2
(45) Date of Patent: Mar. 6, 2007

(54) UHT PASTEURIZER WITH REGENERATION

(75) Inventor: Robert H. Feldmeier, Fayetteville, NY (US)

(73) Assignee: Feldmeier Equipment, Inc., Syracuse, NY (US)

( * ) Notice: Subject to any disclaimer, the term of this patent is extended or adjusted under 35 U.S.C. 154(b) by 317 days.

(21) Appl. No.: 10/717,875

(22) Filed: Nov. 20, 2003

(65) Prior Publication Data

US 2005/0112257 A1    May 26, 2005

(51) Int. Cl.
*A23C 3/02* (2006.01)

(52) U.S. Cl. .................... 426/521; 426/522; 426/524

(58) Field of Classification Search ........ 426/520–522, 426/580–588, 524; 99/452–453; 422/1
See application file for complete search history.

(56) References Cited

U.S. PATENT DOCUMENTS

| | | | | |
|---|---|---|---|---|
| 2,159,110 | A * | 5/1939 | Swarr | 236/18 |
| 2,170,402 | A * | 8/1939 | Faust | 236/18 |
| 2,472,998 | A * | 6/1949 | Ziegler | 165/11.1 |
| 2,522,496 | A * | 9/1950 | Bayer | 134/20 |
| 2,937,856 | A * | 5/1960 | Thomson | 165/66 |
| 3,010,832 | A * | 11/1961 | Dahlstedt | 426/487 |
| 3,041,046 | A * | 6/1962 | Nellis, Jr. et al. | 165/234 |
| 3,364,038 | A | 1/1968 | Bartlett | 99/212 |
| 3,386,497 | A | 6/1968 | Feldmeier | 165/11 |
| 3,451,471 | A * | 6/1969 | Palm | 165/66 |
| 3,567,470 | A * | 3/1971 | McElroy | 426/522 |
| 4,161,909 | A * | 7/1979 | Wakeman | 99/453 |
| 4,416,194 | A * | 11/1983 | Kemp | 99/275 |
| 4,452,034 | A * | 6/1984 | Neuerburg | 56/320.1 |
| 4,534,986 | A * | 8/1985 | Hasting | 426/521 |
| 4,610,298 | A | 9/1986 | van Schagen et al. | 165/39 |
| 4,640,840 | A * | 2/1987 | Assinder et al. | 426/399 |
| 5,266,343 | A * | 11/1993 | Stauffer | 426/522 |
| 6,165,532 | A | 12/2000 | Mutti et al. | 426/522 |

FOREIGN PATENT DOCUMENTS

EP        0 043 276        1/1982        ............... 99/212

OTHER PUBLICATIONS

Colorado.edu. Tube-in-Tube Heat Exchanger. May 19, 2001. http://web.archive.org/web/20010519110616/http://spot.colorado.edu/~meyertr/rwgs/heatexch.html.*
Appendix A. Calculation of Heat Exchanger dimensions.*
Food Chemistry 3rd Edition, Owen Fenema, 1996, Marcel Dekker Inc., p. 866.*

* cited by examiner

*Primary Examiner*—Drew Becker
(74) *Attorney, Agent, or Firm*—Bernhard P. Molldrem, Jr.

(57) ABSTRACT

A pasteurization arrangement employs regeneration to bring raw milk or other liquid food product up to a few degrees below a UHT pasteurizing temperature. The product is first heated up by regeneration to about 175° F., and held at this temperature for about sixty seconds to denaturize proteins so that they do not deposit on the heat exchange walls of following stages. Then the product proceeds through a product-product regenerative heat exchanger where it emerges at about 264° and proceeds to a water-product heater to heat the product to 280° F. The water flows in counter current to the product. The temperature differential at any reference point in the heater and the regenerative heat exchanger is below 20°, and the ratio of rate of water flow to product flow in the heater is below about 3:1.

18 Claims, 3 Drawing Sheets

UHT PASTEURIZER WITH REGENERATION

BACKGROUND OF THE INVENTION

This invention relates to the pasteurization of dairy products such as milk, cream, and ice cream mix and other liquid food products, e.g., fruit juices and soups. The invention is more particularly concerned with a continuous-process pasteurization technique for heating milk (or other food product) to an ultra high temperature suitable for long shelf life, and which recovers most of the heat employed by regeneration, and where the pasteurized product is cooled by incoming raw product, which in turn is heated to a temperature near the pasteurization temperature. The invention is also concerned with a technique which avoids a cooked or scalded taste in the food product.

Unprocessed milk and other raw food commodities are highly perishable, and also may harbor pathogenic microorganisms. Milk is a highly nutritious food, and thus also serves as an excellent growth medium for microorganisms, most of which are capable of deteriorating or spoiling the milk or milk products. This is the case also for fruit juices, broths, and many other liquid food products. Some microorganisms are pathogenic, and can present a threat to public health, and so it is important that the product is rendered completely free of pathogenic microorganisms. Therefore, milk and other liquid food products are processed to make them safe for human consumption and to reduce spoilage to the lowest level possible.

Pasteurization is a process for heat treating the milk or other food process to kill these microorganisms. For milk, pasteurization requires that every particle of milk or milk product be heated to a temperature, for an adequate length of time sufficient to render it free of pathogens, most notably Rickettsia and Mycobacterium tuberculosis. The U.S. Public Health Service has published standards for time-temperature relations for pasteurization of milk and other milk products, and these can be at higher temperatures or longer times for products that may contain added sweeteners or additional milk fat. Most modern dairies employ a continuous process pasteurization technique, rather than a batch process, even for highly viscous products such as ice cream mix. Typically, for most pasteurized milk, other than ultra-pasteurized or UHT pasteurized, a continuous process high-temperature, short time (HTST) technique is used, in which the milk is heated to about 165 degrees F and then passes through a holding tube where the milk is held at that temperature for a short time, e.g., sixteen seconds. These HTST pasteurizers can employ either a plate heat exchanger, or "press," in which parallel plates define flow channels for the milk and for heating and cooling media, or can employ a tubular heat exchanger in which two or more tubes of different diameter are arranged coaxially to define flow paths for the milk and other heat transfer media.

In a HTST set up, cold raw milk (about 40° F.) is supplied from a balance tank into a regenerator section of the pasteurizer. Here the raw milk is heated up by heat given up by pasteurized milk flowing in counter current direction through an opposite side of the regenerator. The raw milk leaves the regenerator and passes through a positive displacement timing pump that delivers the milk under pressure to further stages. The pre-heated raw milk is then forced through a heater section where a heating medium, e.g., water or a food grade synthetic product, heats the milk up to a temperature of at least about 162° F. The milk, having reached this pasteurization temperature, flows through a holding tube or timing tube, where the milk is held at this temperature for a predetermined time, e.g., at least 16 seconds. The velocity of the milk product is determined by the speed of the timing pump, the diameter and length of the holding tube and other sources of surface friction. After passing temperature sensors at the end of the holding tube, the milk flows past a flow diversion device, which is intended to return the milk product through a divert line to the balance tank if the temperature of the product is below the preset pasteurization temperature. Properly heated milk will continue forward, and passes through the pasteurized side of the regenerator where it is cooled by the incoming raw milk. The milk can be cooled further to about 40° F., and processed for bottling, packaging, cheesemaking, or other use. A homogenizer may be used as the timing pump just described, or may constitute additional auxiliary equipment, typically at the stage where the milk or milk product has been heated. Booster pumps are also present in the flow path to ensure correct pressure and flow relationships. For any continuous pasteurization technique, it is important to maintain a higher pressure on the pasteurized side of any product-to-product heat exchanger, such as the regenerator, so that in the event there is any pinhole leak the flow of milk is away from the pasteurized side. This prevents contamination of the pasteurized milk with raw milk. The pressure differential is maintained using the timing pump, and other pumps and pressure controllers, and by ensuring that there is any vertical rise in the product flow path is kept within limits.

The purpose of the regenerator is to save energy used in heating and cooling the food product during pasteurization, by using the heat content of the pasteurized product to pre-heat the incoming cold raw milk. The efficiency, i.e., percent regeneration, is equal to the ratio of the temperature increase in the raw milk due to regeneration to the total temperature increase. For example, for cold milk drawn from the balance tank at 40° F., heated through the regenerator to 145° F., and then heated to a final temperature of 165° F., the efficiency would be 84%, i.e., an 84% regeneration:

$$\frac{(145-40)}{(165-40)} = \frac{105}{125} = 84\%$$

As the cost of energy is a significant consideration in the overall cost of processing the milk product, it is desirable to keep the amount of regeneration as high as possible, and thus to reduce the cost of adding heat at the heater stage.

Ultra high temperature treatment of the food product, i.e., UHT pasteurization, involves heating the liquid food product continuously, and ensuring that every particle of the milk or other food product has been held at the predetermined ultrahigh temperature for a minimum length of time. The UHT technique can be incorporated into a sterilization technique, in which the product is heated to a temperature of 240° F. or above, and is held for a corresponding holding time to ensure that the microorganisms and their spores in the product are destroyed. Then the sterilized product is packaged aseptically, and aseptically sealed. The intention here is to permit the liquid food product to be stored at room temperature indefinitely without spoilage due to action of microorganisms. However, the process of ultra high pasteurization processing may alter the flavor or desirable color or texture of the product, and may result in a "cooked" or scalded flavor in the product.

A vacuum treatment is sometimes employed to remove as much of the undesirable flavor components as possible from the product. In the vacuum process, milk is first heated to the desired temperature, and then is passed into a chamber in which the pressure has been reduced by a partial vacuum. The pressure in the chamber is low enough to cause the volatile flavor components to vaporize, and these are then evacuated from the chamber. Some of the water in the product may be evaporated as well. The vacuum treatment will also reduce any flavor components that result from the cows' ingestion of weeds or flavor-producing feed components.

In addition to the public health and spoilage issues addressed by pasteurization, it has been discovered that some proteins and enzymes in milk that will bring about chemical changes in the stored product can be altered or removed, i.e., denaturized, by heat treatment.

A continuous flow milk sterilization process is described in U.S. Pat. No. 3,567,470, in which raw milk is passed though counterflow regenerators to a pasteurizer and then is passed though counterflow heat exchangers where its temperature is raised to a sterilization temperature. However, in this process, there is a rather high temperature differential between the milk and the heating medium in the ultra high temperature heat exchangers used for sterilization, so that the temperature differential between the milk and the heating medium at any given point of reference is always above 20 degrees and may reach 40 degrees F. This means that the heating medium (steam) entering the heat exchanger has to be 300° F. to raise the milk to a sterilization temperature of 270 to 280° F., and the medium leaving is at 280° F. where it meets the product entering at 240 to 260° F. The processed milk in this system has to pass through a pair of vacuum tanks to remove air and entrapped volatile gases in an attempt to remove the objectionable burnt flavor that is associated with the sterilized milk.

OBJECTS AND SUMMARY OF THE INVENTION

It is an object of the present invention to provide a process for UHT pasteurization of liquid food products that avoids the drawbacks of the prior art.

It is another object to provide a process for UHT pasteurization that maintains the temperature differential in the heater stages at a level that maximizes the regeneration efficiency and also avoids off flavors, i.e., cooked or scalded flavors, in the liquid food product.

It is a further object to provide an arrangement that denaturizes proteins and similar components of the food product so that they do not deposit on walls of the heater in the ultra high temperature stage or in the regenerator.

It is another object to provide an arrangement that can convert an existing pasteurizer, i.e., HTST pasteurizer (163 to 175° F.) which may have an overall regenerative efficiency of 90% to a UHT or aseptic pasteurizer (280° F.) with an overall regeneration of over 85%.

A related object is to provide an arrangement that can convert a dairy product high temperature pasteurizer to a UHT pasteurizer without requiring alterations of the existing pasteurizer.

It is yet a further object to provide a UHT pasteurizer in which the product is brought up to a sterilization temperature (e.g., above 250° F.) rapidly and efficiently.

Another object is to pasteurize milk and other dairy products at temperatures up to or in excess of 280° F. without loss of protein that deposits on heat transfer surfaces.

According to one aspect of the invention, a process for ultrahigh temperature pasteurization of a liquid food product employs a first product-to-product regenerative heat exchanger, a first heater stage, a second product-to-product heat exchanger, and a UHT heater stage. The liquid food product is supplied from a source, e.g., as balance tank, through a raw-product side of said first regenerative heat exchanger to pre-heat same. Then the preheated liquid food product exiting the first heat exchanger is heated, as need be, to a predetermined intermediate temperature suitable for denaturizing proteins in the liquid food product, and the product is held at that intermediate temperature, e.g., by flowing through a timing tube for a predetermined time suitable for denaturing the proteins. The liquid food product enters a raw-product side or pathway of the second regenerative heat exchanger to preheat the same from the intermediate temperature to a temperature near the UHT pasteurizing temperature. The liquid food product exiting the second heat exchanger flows into a medium-to-product heater in the UHT heater stage where the liquid food product up to the UHT temperature. Here, the UHT heater stage employs a heating medium (water or a food grade glycol) that flows in counterflow to the product through the heater. The liquid food product exiting the heater is held at the UHT temperature for a predetermined length of time, which may be a few seconds. Then the liquid food product returns through a pasturized side of the second regenerative heat exchanger in counterflow to the liquid food product flowing in the raw side to warm the product flowing in the raw side, and continues to flow through a pasteurized side of the first regenerative heat exchanger in counterflow to the liquid food product flowing in the raw side thereof to heat the product flowing in the raw side. The pasteurized product may be further cooled, and sent to a fill tank where it is ready for filling bottles or containers, or for other processing. In this invention, the temperature differential in the medium-to-product heater between the liquid food product and said heating medium at any point of reference in the heater is less than 20 degrees F. In a favorable embodiment, the temperature differential between the entering product and leaving medium can be about 15 degrees, and that between the leaving product and the entering medium may be only a few degrees, e.g., 5 degrees. The temperature differential between the raw product leaving the second stage regenerative heat exchanger and the pasteurized product entering is also below 20° F. The volume rate of flow of the medium through the UHT heater should be at most about three times the rate of flow of the liquid food product, and the volume flow rate ratio may be 2:1.

In the preferred embodiment, the food product is heated to an intermediate temperature of substantially 175° F., and the associated timing tube holds the milk at that temperature for sixty seconds. This ensures that the milk proteins are suitably denaturized so that they do not deposit on the hot surfaces of the second regenerative heat exchanger or of the UHT heater. A homogenizer may be used as the timing pump at this intermediate heating stage.

In some embodiments, the regenerative UHT pasteurizer may be an arrangement designed and constructed entirely for that purpose. In other embodiments, the UHT pasteurizer may be an attachment that converts an HTST pasteurizer to a UHT pasteurizer.

The arrangements of this invention may be used for whole milk, skim milk, cream, or other dairy products such as flavored milk or ice cream mix. The arrangements of this invention may also be used for processing orange juice, grapefruit juice, apple juice, or other fruit juices. Favorably, the equipment is of a tubular heat exchanger design, and may be cleaned-in-place with a minimum of down time. A triple-tube heat exchanger that is suitable for use in various possible embodiments is described in Feldmeier U.S. Pat. No. 3,386,497, which is incorporated herein by reference.

The above and many other objects, features, and advantages of the arrangements and techniques of the present invention will become apparent from the ensuing detailed description of preferred embodiments of the invention, when considered in connection with the accompanying Drawing.

DETAILED DESCRIPTION OF THE PREFERRED EMBODIMENT

Figure 1:
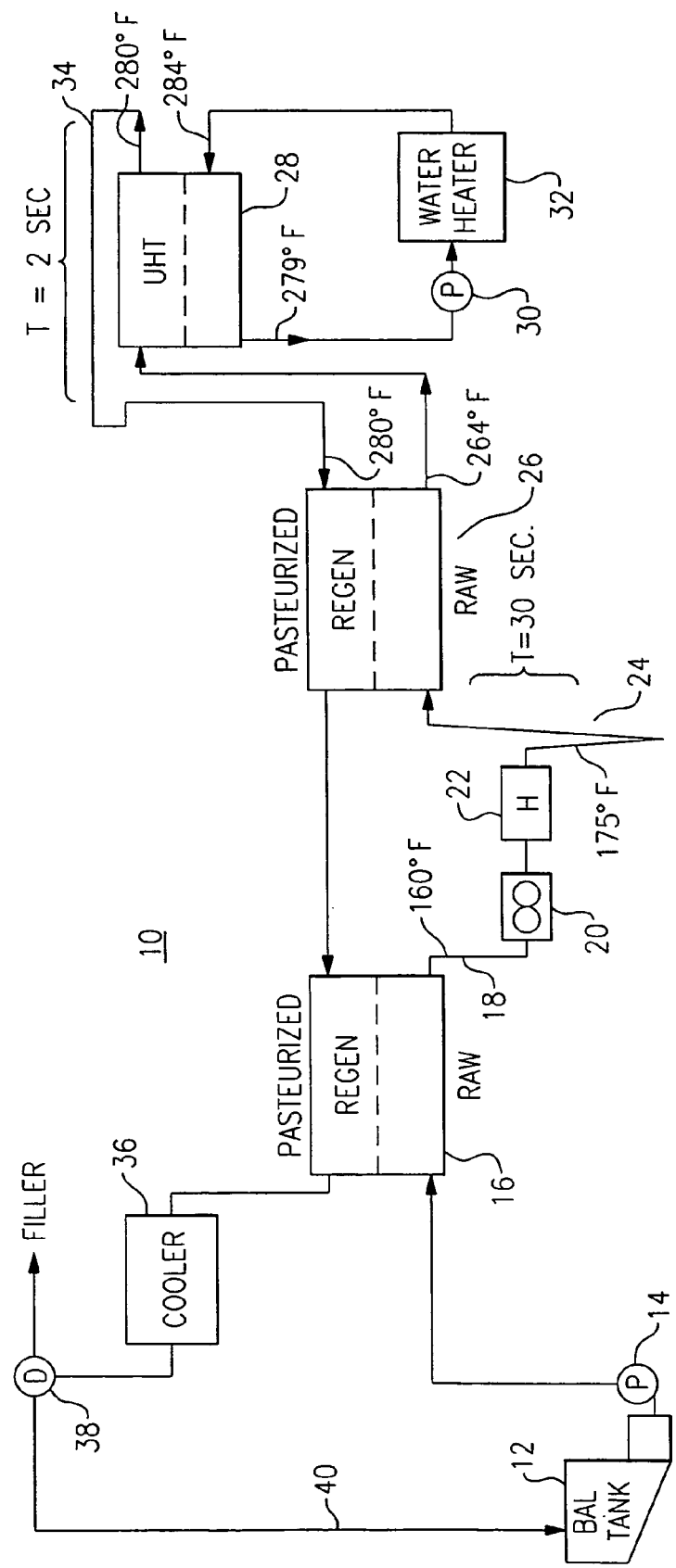
FIG. 1 is a generic diagram for explaining the UHT pasteurization technique of this invention.

To pasteurize milk legally, the milk must be heated to a minimum 163° F. (72.8° C.) and held at that temperature for at least 15 seconds. Milk product with a fat content of 10% or more must be heated to at least 168° F. and held for at least 20 seconds. There are alternative time-temperature relations, where the product can be heated to a higher temperature for a shorter period. One example of this is ultra high temperature pasteurization, or UHT, defined as heating the milk product to 280° F. and holding at that temperature for a minimum of two (2) seconds. At the present time, the majority of the milk in the U.S. that is pasteurized and bottled is heated between 163° F. and 175° F. and then cooled below 40° F. The equipment used to attain such pasteurization uses either a tubular heat exchanger or a plate type heat exchanger or press. These heat exchangers generally consist of three sections: a heater, a regenerator, and a cooler. The heating medium is usually water a few degrees higher than the pasteurization temperature. The cooling medium is typically ice water or food grade propylene glycol being at a lower temperature than the desired milk temperature. The regenerator stage or section enables the raw milk to be heated by the pasteurized milk, and the pasteurized milk to be cooled down by the raw milk. The regenerator is considered product-to-product, that is, the medium on both sides is the milk. The pasteurized milk is on one side of the plate or in one tubular pathway, while the raw milk is on the other side. In the case of a tubular heat exchanger, an inner tube is mounted coaxially within an outer tube to define counterflow paths for the raw and pasteurized milk. The raw milk is either on the inside or outside of the tubing with the pasteurized milk on the opposite side flowing in counter current.

For ultra-high temperature (UHT) pasteurization, there are two methods presently in use. One method employs steam that is injected into the milk in a heater section, and then the milk goes through a vacuum chamber to remove the condensed water vapor and at the same time cool the milk before it enters a plate or tubular regenerator and final cooler. The percent regeneration with this type of arrangement is less than 75%. The other method in use employs tubular heat exchangers for the heating section, and tubular or plate hat exchangers for regeneration and cooling. In these arrangements, the regenerators are not product-to-product, but rather water-to-product. Circulating water cools the pasteurized product in one heat exchanger. This water which has gained heat is used in a second heat exchanger to preheat the raw product. The maximum practical total regeneration with this type of regeneration is only about 80%, and typically below 75%. All the practical UHT and aseptic dairy product pasteurizers in the U.S. today utilize water-to-product regeneration. When the product emerges from the regenerator, it is pumped through a tubular heat exchanger at a very high velocity (i.e., 18 feet/second) and consequently at a very high pressure drop through its tubes. The conventional thinking is that to minimize heat flavor to the product, the residence time of the product that is being heated up from approximately 220° F. to 280° F. should be as short as possible. Also, the current thinking is to pump milk at very high velocities to minimize the milk solids being deposited on the inside walls of the plates or tubes or other heat transfer surface. These deposits negatively affect the length of operation before having to flush and clean. Homogenization is carried out after the UHT stage, that is, after the product has been heated up to 280° F. and then has been cooled rapidly to approximately 175° F.

The challenge facing the dairy industry and the fruit juice industry is to address the need for a pasteurizing system that can be used for ultra high temperature pasteurization, which has a high regenerative efficiency and produces pasteurized product without noticeable flavor degradation. The pasteurizer arrangement should have a capability of long production runs, i.e., 8 to 10 hours, while maintaining an overall regeneration efficiency of 80% to 90%. The temperature of pasteurization should be adjustable so that the system can be used for aseptic or UHT pasteurization of milk, pasteurization of viscous dairy products such as ice cream mix or heavy cream, while maintaining a regeneration efficiency of up to 75%, or for pasteurizing fruit juices and pulp.

The arrangement has to employ differential pressure controls so that any pinhole that might occur would permit any leakage of the milk to be in the direction of the pasteurized side to the raw or unpasteurized side so that there is no contamination of the pasteurized milk. Ideally, the arrangement should avoid vacuum chambers and additional pumps, and still produce milk with an acceptable flavor. The UHT or aseptic system must be sterilized prior to processing the milk or other liquid food product at over 250° F. for 20 to 30 minutes. All pipelines that conduct the product must be sterilized.

In a conversion of an existing pasteurizer to a UHT pasteurizer, the UHT section can be installed at the point where the dairy product emerges from a legal flow diversion valve. The product flows from that point to a centrifugal pump. A vacuum breaker is installed between the flow diversion valve and the pump so that the pump does not influence the volume that exits the flow diversion valve. The product is then pumped through a double tube regenerator or triple tube regenerator of the type described in Feldmeier U.S. Pat. No. 3,336,497, and then proceeds to the suction side of another centrifugal pump, where the product is pumped through another double tube, triple tube, or multi-tube heat exchanger. The tubes that carry the product have heated water surrounding it or them and the water is flowing in counter current to the product. The hot water is just a few degrees above the UHT temperature, that is, 289° F. for a product temperature of 285° F. Within the water-to-product heat exchanger, the water volume flow rate is higher than the product flow rate, but less than three times the product flow rate. The heated product flows through a holding tube where the UHT temperature is maintained for a predetermined period of time, e.g., two seconds, and then the product passes into the return or pasteurized side of the regenerator.

Once the product reaches 280° or more it is held for two seconds and then flows counter currently through the above-mentioned regenerator. Within the regenerator, the ultra-pasteurized product pressure will be higher than that of the raw product that has not been heated to 280° F. Then the product exits this regenerator and is passed through the pasteurized product side of the existing pasteurizer regenerative heat exchanger, to be cooled. Note that the unpasteurized product bypasses the regenerator during start up. By law, milk is not allowed to flow in the unpasteurized side of the regenerator unless the pasteurized product is at a pressure higher than either of the raw product pump capabilities. After the milk emerges from the first regenerator, a holding tube or chamber maintains the milk at a predetermined temperature (e.g., 175° F.) for a period of time (30 seconds to 60 seconds) to denaturize the milk solids so that they do not deposit on the sides of the heat exchanger tubes.

With this UHT conversion, the ultra pasteurized milk has an acceptable taste, either as white milk or as another dairy product. Any objectionable flavor that might be present immediately after pasteurization dissipates and in not noticeable later, especially after the product has been in a package for about eight hours.

The system can run continuously over 8 hours, as the residence times in the legal holding tube and the auxiliary holding tube, plus the residence time in the regenerator, will denaturize the product so that the protein does not precipitate out and clog the tubes or restrict the flow. With this conversion, 40% cream and other viscous product will be run at about 50% capacity as the existing system would most likely be unable to handle a full volume of the viscous product, and would limit the capacity of the UHT conversion section.

The system can also be constructed as a complete, self standing UHT or aseptic pasteurizer, using a double tube or triple tube product-to-product regenerator. A double tube or multi-tube heat exchanger is used in the water-to-product heat exchanger and is designed so that the product velocity need not exceed about 8 to 9 feet per second, and can typically be at 6 feet per second. Generally the residence time from the time the product is homogenized until it reaches the final temperature of 280° will be about two minutes. The velocity in the heater section will be about six feet per second, with a pressure drop of only about 20 PSI. This results in a large energy saving over systems now employed that have velocities in the heating sections of approximately eighteen feet per second with very short residence times, i.e., less than 20 seconds. The overall regeneration efficiency will be about 90%.

The UHT pasteurizer can operate continuously for over 8 hours without protein build up to the point that the heat exchange rate is negatively affected. This system will also pasteurize viscous products at the same flow rate as milk, providing the surface area in the heater section is larger than in a milk pasteurizer system. The percentage of regeneration in this system would be less for viscous products than for milk (or juices).

After the first regenerator, the milk is held at the intermediate pasteurizing temperature for one or two minutes to denaturize the proteins. The holding tube for this would preferably be in the nature of a double tube, triple tube, or multi-tube. In the case of an ice cream mix or other viscous products, heat may be applied to bring the temperature up to a suitable homogenization temperature. Prior to processing the product, heat will be applied to the circulating water to sterilize the raw side of the regenerator and to assist the heating section to bring the entire system up to standardization.

With reference to the Drawing, FIG. 1 is a schematic to explain the general principles behind the pasteurization technique of this invention. Here, raw milk, i.e., milk that is to be pasteurized, is supplied to a balance tank 12 from a supply line (not shown), and the milk is drawn from this tank and pumped by a booster pump 14 through the raw milk side of a first stage regenerative heat exchanger 16. The milk on the raw side is heated up by the returning pasteurized milk on the pasteurized side of the heat exchanger, which in turn is cooled by the raw milk. The milk in the balance tank is kept at about 40° F. or below, and is heated up in the regenerative heat exchanger 16 so that at a leaving point 18 the milk is at an intermediate temperature of about 160° F. A homogenizer 20, which may be used as a timing pump, pumps the heated milk at a predetermined rate through a supplemental heater that brings the milk to a higher intermediate temperature of 175° F. The milk passes through a holding tube 24 where the milk is held for a predetermined minimum time (e.g., 60 seconds) at 175° to denaturizes the milk proteins so the milk solids to not precipitate out and coat the walls of the following stages.

The milk then enters the raw side of a second stage regenerative heat exchanger 26, where the milk flows in counter current with pasteurized milk that is returning on the pasteurized side, so that the pasteurized milk is cooled and the raw milk is heated up to a temperature near the UHT pasteurizing temperature. In this example, the milk leaving the raw side of the second stage regenerative heat exchanger 26 has been heated to a temperature of 264° F. and the pasteurized milk entering the pasteurized side is at the UHT temperature of 280° F.

The milk from the raw side of the heat exchanger 26 passes into a heater 28 that brings the milk temperature up to the UHT temperature of 280°. In this case, the heater 28 is a tubular heat exchanger, which can be a multi-tube tubular unit, with hot water being the heating medium and flowing in countercurrent with respect to the milk (or other food product). A water circulating portion of this embodiment employs a water circulating pump 30 and a heater 32 that brings the water to a temperature a few degrees above the UHT temperature, and here to 284° F. The water entering the heater 28 is supplied at 284° F. and after giving heat off to the milk the water leaves the heater at 279° F. The flow rate of the hot water is higher than the flow rate of the milk through the heater 28, but is kept below about three times the flow rate, and favorably about two times. This results in the temperature differential between the food product and the heating medium being below twenty degrees F at any reference point within the heater, and in this example, the temperature differential is only four to six degrees between the entering water and the exiting milk, and only about fifteen degrees between the entering milk and the exiting water.

The milk leaving the heater 28 passes through a holding tube 34 where it is held at the UHT temperature (280°) before entering the return side, i.e., pasteurized side, of the second heat exchanger stage 26. It should be noted also that at this stage, the temperature differential in the regenerative heat exchanger 26 between the pasteurized product entering and the raw product leaving (280° minus 264° F.) is below 20 degrees, and the temperature differential between the pasteurized product and the raw product at all reference points within the second stage heat exchanger stage is below 20 degrees.

The pasteurized milk that leaves the second stage regenerator 26 then passes through the pasteurized side of the first stage regenerative heat exchanger 16, and leaves at about 60° F. The pasteurized product then passes through a cooler 36, i.e, a tubular heat exchanger where ice water or propylene glycol, for example, is used as the cooling medium, where the milk is cooled again down to 40° F. or below, and passes through a diversion valve 38 to a filler tank (not shown). A diversion line 40 returns product to the tank 12 when the valve 38 opens. Various other diversion lines and valves, sterilization water heaters, and the like, are not shown here, but would be understood to be present in any practical design, and their construction and operation would be well understood by persons in this field.

In some cases, i.e., where the product is whole milk or skim milk, the temperature at the point 18 leaving the first regenerative heat exchanger may be sufficient for homogenization and denaturization, in which case the heater 22 could be omitted. The hold time in the hold tube 24 also depends on the nature of the product and the intermediate temperature at that point. In some cases, a vacuum tank may be used in place of the hold tube 26 for the purpose of removing onion or other disagreeable flavors from the milk, and also to hold the milk at the intermediate temperature for the time necessary.

The velocity of the milk through the system should be below about nine feet per second and normally does not need to exceed about six feet per second, especially in the second stage regenerative heat exchanger 26 and in the medium-to-product heat exchanger 28.

Figure 2:
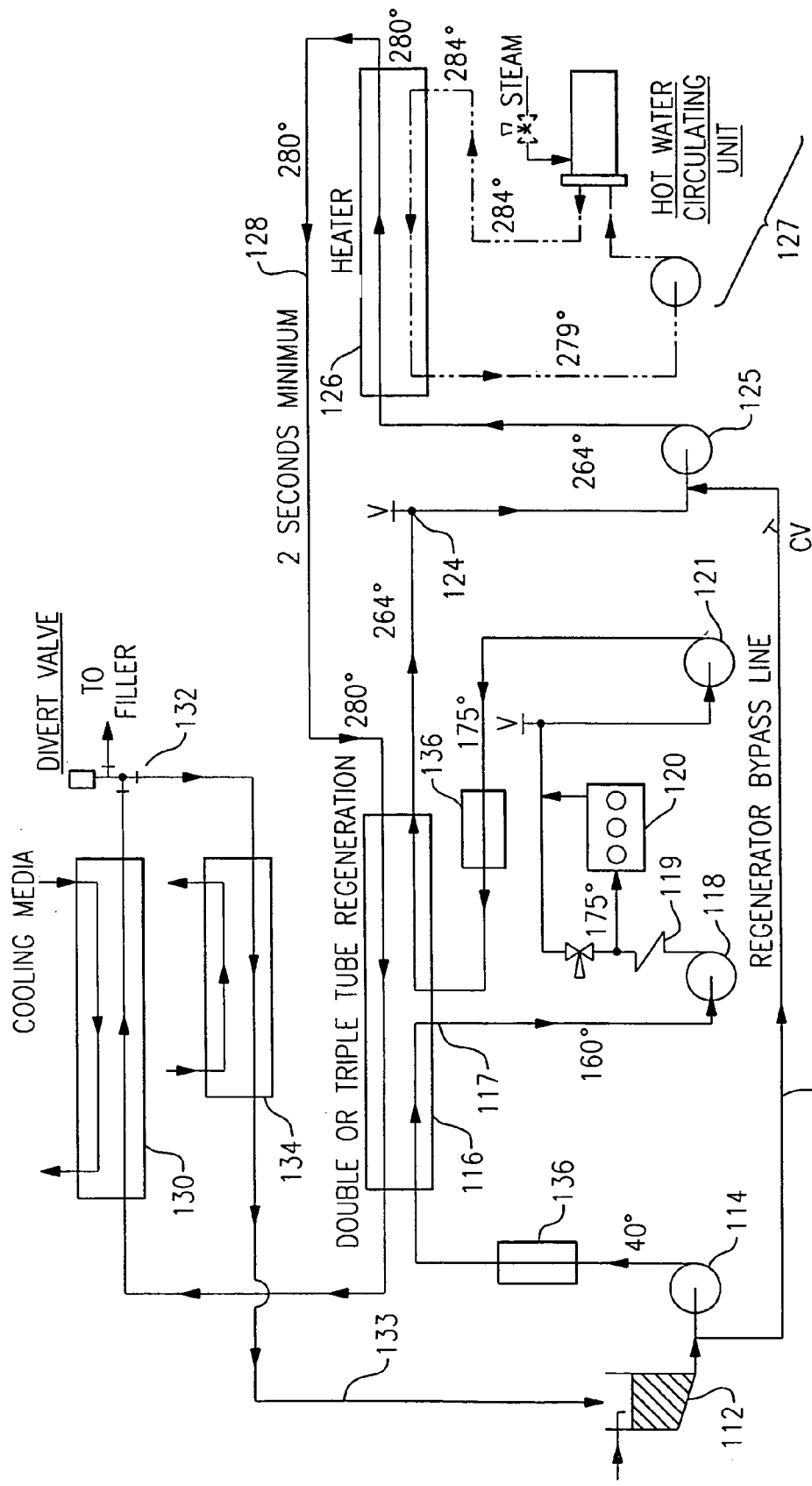
FIG. 2 is a schematic view of a UHT pasteurizer of one embodiment of the invention.

One practical embodiment of this invention is shown in the arrangement of FIG. 2, which is a self-contained or dedicated UHT or aseptic pasteurizer. Fresh milk is supplied to a balance tank 112 and the milk is pumped from the balance tank by a booster pump 114 through the raw milk side of a regenerator 116, which may be a two-tube or three-tube heat exchanger. This is a product-to-product heat exchanger in which pasteurized milk is flowing in counter current through a pasteurized flow path, so that the pasteurized milk warms up the raw milk, and the raw milk cools the pasteurized milk. At a mid portion of the regenerator, a take off 117 the milk has reached an intermediate temperature, and then the milk passes from the take off 117 though a booster pump 118 to a holding tube 119 where the milk is maintained for a predetermined time, e.g., sixty seconds, to denaturizes the milk solids. If the milk at the take off 117 is at a sufficient temperature, e.g., 175° F., then no additional heat is needed at this point. However, in this example, the milk at this stage is 160° F., and in this case the hold tube 119 can be preceded by a heater stage to heat the milk or other product up to 175°. Following the hold tube 119, a homogenizer 120 breaks up fat globules in the milk and also serves as timing pump. Then a booster pump 121 flows the milk back into a second portion of the regenerator 116, where it is again preheated, here to a temperature just below the predetermined UHT temperature. In this embodiment, the milk leaving the raw side of the regenerator 116 is at 264° F. The preheated product flow past a diversion valve or valves 124 (diversion lines not shown) to another booster pump 125, from which the milk flow through a UHT heater 126. In the heater 126, the milk is heated from 264° to 280°. This is a medium-to-product heat exchanger, which may be a multi-tube tubular heat exchanger, with the heating medium being water flowing counter current to the milk or other dairy product. A hot water circulating unit uses steam to heat the water to a temperature a few degrees above the UHT temperature, here 284° F. The water entering the heater is at a temperature of 284° and the water leaving is 279°, so the temperature differential throughout the heater is between four and fifteen degrees. The milk or other dairy product has a flow rate of about 6 feet per second, and the volume rate of flow of hot water compared to the volume rate of flow of the product is below 3:1, typically closer to 2:1.

The product leaving the heater 126 ten passes through a hold tube 128, where the temperature of 280° is maintained for a predetermined hold time, here two seconds, and then the milk is considered ultra pasteurized, and is microbe free. The pasteurized product then returns through the pasteurized flow path in the regenerator 116, where it is cooled by the raw product down to about 60° F. This is followed by a cooler stage 130, where the milk is cooled by ice water or an approved food-grade medium such as propylene glycol, and leaves at about 40° F. The cooled pasteurized milk flows to a diversion valve 132, and thence to a filler tank. A divert line 133 leads back to the balance tank 112. A divert line heater 134 is used for heating sterilizing water for the divert line, and other water heaters 136 are used for heating sterilizing water to about 250° F. at other portions of the pasteurizer. These can be steam-to-water heat exchangers. A regenerator bypass line 135 may be used at startup.

Pressure differentials have to be maintained throughout the system so that the pasteurized side at any given point is at a positive pressure, and any pinhole leaks would result in flow of pasteurized product to the raw side, and not vice versa. At all points in the regenerator 116 and heater 126, the flow rate is only about six feet per second, and the temperature differential between the one side and the other at any reference point is below twenty degrees.

With the set up as described there is a high rate of regeneration, in this example, 87%. If the intermediate temperature at the take off 117 does not need to be boosted by an additional heater to 175°, then the regeneration efficiency can be over 90%.

Figure 3:
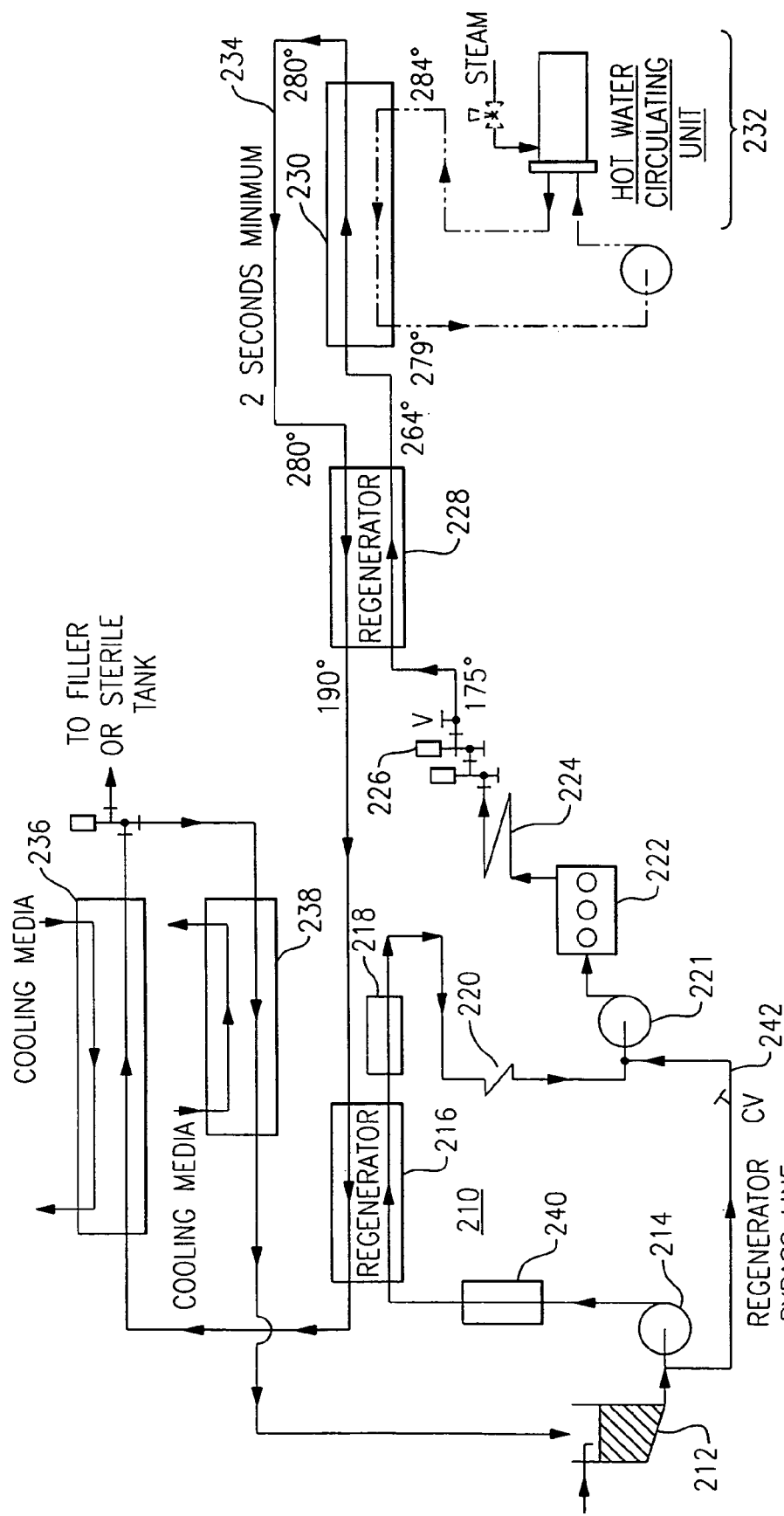
FIG. 3 is a schematic view of a UHT pasteurizer of another embodiment of the invention.

FIG. 3 illustrates an embodiment in which a standard HTST pasteurizer is converted to a UHT pasteurizer by adding additional regeneration and heating stages. Here, an existing HTST pasteurizer 210 draws milk from a balance tank 212, and pumps it using a booster pump 214 through the raw side or raw flow path of a regenerator 216. The raw milk is heated by the returning pasteurized product flowing countercurrently, and exits at an elevated temperature. The raw product that exits the regenerator 216 flows through a heater 218, where it is heated to a predetermined high-temperature pasteurization temperature, e.g., 175°, and then goes to a holding tube 220, where it is maintained for a minimum time (e.g., sixty seconds) for denaturing the protein in the product. It may be noted that a de-aerator or vacuum chamber at this point will also accomplish some denaturization of proteins, as there will be a holding time in such a chamber. The holding tube may be in the form of a double-tube, triple-tube or multi-tube which may be employed for heating ice cream mix or other viscous products. After this denaturizing treatment, the UHT section can handle the product at the same capacity as for milk. A double, triple, or multiple tube holding tube can also be used to heat water during sterilization. After the holding tube 220, a centrifugal pump 221 flows the product through a homogenizer 222, which may also serve as timing pump, and the product exiting the homogenizer passes through a legal holding tube 224 where the product is held for a predetermined HT holding time (e.g., 15 seconds). Then the product passes to a set of flow diversion valves 226 (flow diversion lines are not shown here), and thence to the outgoing or raw product flow path of a second regenerator 228. The second regenerator heats the milk (or other product) by heat exchange with the returning pasteurized product, so that the product leaving the regenerator 228 is a few degrees below the predetermined UHT pasteurizing temperature. Here, the leaving temperature is 264° F., which is sixteen degrees below the UHT pasteurizing temperature of 280° F. The product leaving the raw side of the regenerator 228 enters a heater 230 where the product is heated to 280°. The heater 230 is preferably a medium-to-product heat exchanger where hot water heated to 284° F. enters the heater 230 and flows in countercurrent with the product, and exits at 279° F. A steam-heated hot water circulating unit 232 provides the hot water at the prescribed temperature and at a predetermined flow rate. The rate of flow of the hot water through the heater 230 should be kept below three times the rate of flow of product, and favorably about twice the rate of flow of product.

The product that exits the heater 230 flows through a holding tube 234, where it is held at the UHT temperature of 280° for a prescribed time, e.g., two seconds minimum. After that, the pasteurized product enters the return side of the second heat exchanger 228, where it is cooled by heat exchange with the incoming raw product. In this embodiment, the pasteurized product enters the regenerator 228 at 280° F. and leaves at 190° F. At the same time, the raw product enters the regenerator 228 at 175° F. and leaves at 264° F. This means that the temperature differences at the low temperature and high temperature ends of the regenerator 228, between the pasteurized and unpasteurized product, are fifteen degrees and sixteen degrees, respectively. The temperature differentials at all reference points between the high and low temperature ends will also be approximately 15-16° F., and will in all events be below 20° F.

The pasteurized product that exits the regenerator 228 then flows through the pasteurized side of the first regenerator 216, where is cooled by the incoming raw product, and exits at a temperature of about 60° F. Then the product passes through a cooler 236, i.e., a heat exchanger where the pasteurized product is cooled by ice water or a food grade synthetic coolant, and exits at about 40° F. or below. From here, the pasteurized product passes a diversion valve to flow to a filler tank or sterile filler equipment (not shown). A diversion line sterilizer 238 heats water for the diversion line that leads to the balance tank, and can also be used for cooling the sterilizing water from a high temperature (up to 250°) to below boiling.

One or more steam heaters 240 may be provided for heating sterilizing water for sterilizing the raw side passages, and a regenerator bypass line 242 is provided around the first regenerator 216 for use during start up.

The regenerative heat exchanger 228 could be a tripletube device of the type shown in U.S. Pat. No. 3,386,497, where there are inner, middle, and outer tubes arranged coaxially, to define an inner flow passage, an outer annular flow passage, and a middle annular flow passage. The heater 230 could also be a triple-tube heat exchanger with the milk or other product flowing in the annular space between the inner and middle tubes, and the hot water or other medium flowing counter-currently in the outer and inner spaces.

The pre-existing HTST pasteurizer 210 may employ tubular heat exchangers, or may be of the type employing a plate or press heat exchanger for the regenerator 216.

In the UHT pasteurizer arrangement as described here, the regeneration efficiency of the UHT stage is a minimum of 81%, and where a tubular heat exchanger is employed also as the first stage regenerator 216, the total UHT or aseptic pasteurizer arrangement can have a regeneration efficiency exceeding 85% for liquids such as whole milk. For more viscous products such as ice cream mix, UHT or aseptic pasteurization can have a regeneration efficiency of 75%. The equipment employed here requires only standard dairy tubing and fittings, which only need to be rated for up to 300 psi. The denaturizing of the milk or other food product prior to going to the UHT stage, and homogenizing the milk at an elevated intermediate temperature prior the UHT stage prevent milk solids from depositing on the heat exchange surfaces in the heater or in the regenerator. This improves the regeneration, due to absence of solids that would limit or inhibit heat exchange. Also, because the solids do not deposit, the equipment can run for extended times before maintenance is required.

While the invention has been described with reference to a few selected embodiments, it should be recognized that the invention is not limited to those precise embodiments. Rather, many modifications and variations will be apparent to persons skilled in the art without departing from the scope and spirit of this invention, as defined in the appended claims.

I claim:

1. Process for ultrahigh temperature pasteurization of a liquid food product using a pasteurization arrangement having a first product-to-product regenerative heat exchanger, a first heater stage, a second product-to-product heat exchanger, and a UHT heater stage; comprising the steps of supplying said liquid food product through a raw-product side of said first regenerative heat exchanger to pre-heat same;

heating said preheated liquid food product exiting the first heat exchanger to a predetermined intermediate temperature suitable for denaturizing proteins in the liquid food product;

flowing the liquid food product at said intermediate temperature through a timing tube to hold the product at said intermediate temperature for a predetermined time sufficient for denaturing said proteins therein, wherein said predetermined intermediate temperature at which said denaturing occurs is substantially 175 degrees F., and wherein said predetermined time that said timing tube holds the product at said intermediate temperature is at least sixty seconds;

flowing said liquid food product from said timing tube through a raw-product side of said second regenerative heat exchanger to preheat the same from said intermediate temperature to a temperature near a UHT pasteurizing temperature;

flowing the liquid food product exiting said second heat exchanger into a liquid medium-to-product heater in said UHT heater stage to heat the liquid food product to a predetermined UHT temperature, the UHT heater stage including means supplying a heated liquid medium in counterflow to said product through said liquid medium-to-product heater;

holding the liquid food product exiting said medium-to-product heater at said UHT temperature for a predetermined length of time;

flowing the liquid food product through a pasteurized side of said second regenerative heat exchanger in counterflow to the liquid food product flowing in the raw side thereof to transfer heat to the product flowing in the raw side thereof;

flowing the liquid food product exiting the pasteurized side of the second regenerative heat exchanger through a pasteurized side of the first regenerative heat exchanger in counterflow to the liquid food product flowing in the raw side thereof to transfer heat to the product flowing in the raw side thereof; and further processing the liquid food product leaving the pasteurized side of the first regenerative heat exchanger to prepare same for packaging;

wherein a temperature differential in the medium-to-product heater between the liquid food product and said heating medium at every point of reference in the heater is less than 20 degrees F.

2. The process for ultrahigh temperature pasteurization according to claim 1 wherein the liquid food product has a product volume rate of flow through said liquid medium to product heater and said heated liquid medium has a liquid medium volume rate of flow through said heater, and the ratio of the liquid medium rate of flow to the product rate of flow is below 3:1.

3. The process for ultrahigh temperature pasteurization according to claim 1 wherein said ratio of liquid medium to product flow rates is about 2:1.

4. The process for ultrahigh temperature pasteurization according to claim 1 wherein the temperature differential in the medium-to-product heater between the product leaving and the medium entering is about 5 degrees F.

5. The process for ultrahigh temperature pasteurization according to claim 1 wherein the temperature differential in the medium-to-product heater between the product entering and the medium leaving is about 15 degrees F.

6. The process for ultrahigh temperature pasteurization according to claim 1 wherein the temperature differential in the second regenerative heat exchanger between the product leaving the raw side and the product entering the pasteurized side is than 20 degrees F.

7. The process for ultrahigh temperature pasteurization according to claim 1 further comprising passing said product through a homogenizer prior to flowing the same through the raw side of the second regenerative heat exchanger.

8. The process for ultrahigh temperature pasteurization according to claim 6 wherein said first and second regenerative heat exchangers are tube-in-tube counterflow heat exchangers.

9. Process for ultrahigh temperature pasteurization of a liquid food product using a pasteurization arrangement having a first product-to-product regenerative heat exchanger, a first heater stage, a second product-to-product heat exchanger, and a UHT heater stage; comprising the steps of supplying said liquid food product through a raw-product side of said first regenerative heat exchanger to pre-heat same said preheated liquid food product exiting the first heat exchanger to a predetermined intermediate temperature sufficient for denaturizing proteins in the liquid food product, wherein said predetermined intermediate temperature at which said denaturing occurs is substantially 175 degrees F., and maintaining the liquid food product in a timing tube to hold the product at said intermediate temperature for predetermined time of at least sixty seconds;

flowing the liquid food product at said intermediate temperature through a device to hold the product at said intermediate temperature for a predetermined length of time sufficient for denaturing said proteins therein;

flowing said liquid food product from said device through a raw-product holding the liquid food product exiting said medium-to-product heater at said UHT temperature for a predetermined length of time;

flowing the liquid food product through a pasturized side of said regenerative heat exchanger in counterflow to the liquid food product flowing in the raw side thereof to transfer heat to the product flowing in the raw side thereof; and further processing the liquid food product leaving the pasteurized side of the regenerative heat exchanger to prepare same for packaging;

wherein a temperature differential in the medium-to-product heater between the liquid food product and said heated liquid medium at every point of reference in the heater is less than 20 degrees F.

10. The process for ultrahigh temperature pasteurization according to claim 9 wherein the liquid food product has a product volume rate of flow through said medium to product heater and said heated liquid medium has a liquid medium volume rate of flow through said heater, and the ratio of the liquid medium rate of flow to the product rate of flow is below 3:1.

11. Process for ultrahigh temperature pasteurization of a liquid food product using a pasteurization arrangement having a product-to-product regenerative heat exchanger and a UHT heater stage; comprising the steps of supplying said liquid food product trough a raw-product side of said regenerative heat exchanger to pre-heat same, including denaturizing proteins in the liquid food product by holding the liquid food product in a timing tube for a predetermined time at a predetermined intermediate temperature, wherein said predetermined intermediate temperature at which said denaturing occurs is substantially 175 degrees F., and wherein said predetermined time that said timing tube holds the product at said intermediate temperature is at least sixty seconds, and preheating the liquid food product from said to a temperature near a UHT pasteurizing temperature;

flowing the liquid food product exiting said regenerative heat exchanger into a liquid medium-to-product heater in said UHT heater stage to heat the liquid food product to a predetermined UHT temperature, the UHT heater stage including means supplying a heated liquid medium in counterflow to said product through said medium to product heater; side of said second regenerative heat exchanger to preheat the same from said intermediate temperature to a temperature near a UHT pasteurizing temperature;

flowing the liquid food product exiting said second heat exchanger into a liquid medium-to-product heater in said UHT heater stage to heat the liquid food product to a predetermined UHT temperature, the UHT heater stage including means supplying a heated liquid medium in counterflow to said product through said liquid medium-to-product heater;

holding the liquid food product exiting said liquid medium-to-product heater at said UHT temperature for a predetermined length of time;

flowing the liquid food product trough a pasturized side of said second regenerative heat exchanger in counterflow to the liquid food product flowing in the raw side thereof to transfer heat to the product flowing in the raw side thereof;

flowing the liquid food product exiting the pasteurized side of the second regenerative heat exchanger through a pasteurized side of the first regenerative heat exchanger in counterflow to the liquid food product flowing in the raw side thereof to transfer heat to the product flowing in the raw side thereof; and further processing the liquid food product leaving the pasteurized side of the first regenerative heat exchanger to prepare same for packaging;

wherein a temperature differential in the liquid medium-to-product heater between the liquid food product and said heated liquid medium at every point of reference in the heater is less than 20 degrees F.

12. The process for ultrahigh temperature pasteurization according to claim 11 wherein the liquid food product has a product volume rate of flow through said liquid medium to product heater and said heated liquid medium has a liquid medium volume rate of flow through said heater, and the ratio of the liquid medium rate of flow to the product rate of flow is below 3:1.

13. The process for ultrahigh temperature pasteurization according to claim 12 wherein said ratio of heated liquid medium to product flow rates is about 2:1.

14. The process for ultrahigh temperature pasteurization according to claim 11 wherein the temperature differential in the medium-to-product heater between the product leaving and the heated liquid medium entering is about 5 degrees F.

15. The process for ultrahigh temperature pasteurization according to claim 11 wherein the temperature differential in the medium-to-product heater between the product entering and the heated liquid medium leaving is about 15 degrees F.

16. The process for ultrahigh temperature pasteurization according to claim 11 wherein the temperature differential in the regenerative heat exchanger between the product leaving the raw side and the product entering the pasteurized side is less than 20 degrees F.

17. The process for ultrahigh temperature pasteurization according to claim 11 wherein the product flowing through said medium-to-product heater has a flow velocity of below nine feet per second.

18. The process for ultrahigh temperature pasteurization according to claim 17 wherein said flow velocity is no greater than six feet per second.

* * * * *

UNITED STATES PATENT AND TRADEMARK OFFICE
CERTIFICATE OF CORRECTION

PATENT NO. : 7,186,430 B2
APPLICATION NO. : 10/717875
DATED : March 6, 2007
INVENTOR(S) : Robert H. Feldmeier It is certified that error appears in the above-identified patent and that said Letters Patent is hereby corrected as shown below:

| | |
|---|---|
| Col. 13, Claim 9, line 64: | Add the following paragraphs after the word "raw-product": |
| | --side of said second regenerative heat exchanger to preheat the same from said intermediate temperature to near a UHT pasteurizing temperature; |
| | flowing the liquid food product exiting said second heat exchanger into a liquid medium-to-product heater in said UHT heater stage to heat the liquid food product to a predetermined UHT temperature, the UHT heater stage including means supplying a heated liquid medium in counterflow to said product through said liquid medium-to-product heater;-- |
| Col. 14, Claim 11, line 24: | "trough" should read -- through-- |
| Col. 14, Claim 11, lines 43 - 46: | "side of said second regenerative heat exchanger to preheat the same from said intermediate temperature to a temperature near a UHT pasteurizing temperature;" should be deleted. |
| Col. 14, Claim 11, line 57: | "trough" should read -- through -- |

UNITED STATES PATENT AND TRADEMARK OFFICE
CERTIFICATE OF CORRECTION

PATENT NO. : 7,186,430 B2
APPLICATION NO. : 10/717875
DATED : March 6, 2007
INVENTOR(S) : Robert H. Feldmeier It is certified that error appears in the above-identified patent and that said Letters Patent is hereby corrected as shown below:

Col. 14, Claim 11, lines 62 - 67:   Delete the following paragraph after the word "thereof;":

"flowing the liquid food product exiting the pasteurized side of the second regenerative heat exchanger through a pasteurized side of the first regenerative heat exchanger in counterflow to the liquid food product flowing in the raw side thereof to transfer heat to the product flowing in the raw side thereof;"

Signed and Sealed this

Twenty-ninth Day of May, 2007

JON W. DUDAS
*Director of the United States Patent and Trademark Office*